United States Patent
Scarpa et al.

(10) Patent No.: US 7,414,186 B2
(45) Date of Patent: Aug. 19, 2008

(54) SYSTEM AND METHOD OF TEACHING MUSICAL NOTES

(76) Inventors: Joseph Scarpa, 11 Melissa La., Old Bethpage, NY (US) 11804; Annette Scarpa, 11 Melissa La., Old Bethpage, NY (US) 11804

( * ) Notice: Subject to any disclaimer, the term of this patent is extended or adjusted under 35 U.S.C. 154(b) by 185 days.

(21) Appl. No.: 11/163,499

(22) Filed: Oct. 20, 2005

(65) Prior Publication Data

US 2007/0089589 A1 Apr. 26, 2007

(51) Int. Cl.
G09B 15/00 (2006.01)
G09B 15/02 (2006.01)
G09B 15/04 (2006.01)

(52) U.S. Cl. ............... 84/470 R; 84/477 R; 84/478; 84/479 A; 84/483.2; 84/485 R

(58) Field of Classification Search .................. None
See application file for complete search history.

(56) References Cited

U.S. PATENT DOCUMENTS

| | | | | |
|---|---|---|---|---|
| 5,886,273 A | * | 3/1999 | Haruyama | 84/478 |
| 6,066,791 A | * | 5/2000 | Renard et al. | 84/477 R |
| 6,388,181 B2 | * | 5/2002 | Moe | 84/477 R |
| 6,454,627 B1 | * | 9/2002 | Mak | 446/369 |
| 6,740,802 B1 | * | 5/2004 | Browne, Jr. | 84/609 |
| 2001/0029829 A1 | * | 10/2001 | Moe | 84/478 |
| 2003/0167902 A1 | * | 9/2003 | Hiner et al. | 84/477 R |
| 2004/0244564 A1 | * | 12/2004 | McGregor | 84/478 |
| 2007/0089590 A1 | * | 4/2007 | Katou | 84/609 |

* cited by examiner

*Primary Examiner*—Marlon T Fletcher
(74) *Attorney, Agent, or Firm*—Mark Young, P.A.

(57) ABSTRACT

A system and method of teaching musical notes are adapted to teach identification of music staff notes, the names and sounds of notes, as well as piano keys corresponding to notes. An implementation of the method entails displaying a musical keyboard having a plurality of keys, a musical staff and a note on the staff. One of the plurality of keys corresponds to the note. The corresponding key produces a sound corresponding to the note when played. The name of the note is pronounced by a narrator or some other character. The note is visually identified on the staff by the narrator or some other character. The note is also associated with the corresponding key. Association may entail generating a note character and associating the note character with the note and key. A sound corresponding to the corresponding key is played.

20 Claims, 6 Drawing Sheets

SYSTEM AND METHOD OF TEACHING MUSICAL NOTES

NOTICE OF COPYRIGHT AND TRADEMARK RIGHTS

A portion of the disclosure of this patent document contains material that is subject to copyright protection. This patent document may show and/or describe matter that is or may become a trademark and/or trade dress of the owner. The copyright, trademark and trade dress owner has no objection to the facsimile reproduction by anyone of the patent disclosure, as it appears in the U.S. Patent and Trademark Office patent files and records, but otherwise reserves all copyright, trademark and trade dress rights whatsoever.

FIELD OF THE INVENTION

This invention generally relates to a system and method of teaching musical notes, and more particularly, to an animated system and method adapted to teach identification of music staff notes, the names and sounds of notes, as well as piano keys corresponding to notes.

BACKGROUND

Early music training promotes cognitive development. Neurological research in the area of brain development demonstrates the far-reaching beneficial effect of music introduced early in life. Music is processed in both the right and left hemispheres of the brain and brings about the use of higher brain functions. In particular, music training develops the brain areas involved in language learning, reading and abstract thought and reasoning. Studies have shown that such brain development creates advantages in cognition for many years.

In the past, videos and training materials created for young children to learn musical concepts did not capture and maintain the attention of children or convey information in a memorable manner that children can readily grasp. What is needed is a system and method that teaches musical concepts, particularly note recognition, in a productive and entertaining manner. The system and method should teach young children how to read a note in a staff and identify a corresponding key on a keyboard.

The invention is directed to overcoming one or more of the problems and solving one or more of the needs as set forth above.

SUMMARY OF THE INVENTION

To solve one or more of the problems set forth above, in an exemplary implementation of the invention, an animated system and method of teaching musical notes are provided. The system and method are adapted to teach identification of music staff notes, the names and sounds of notes, as well as piano keys corresponding to notes in a productive and entertaining manner using a sequence of animated events. Using the system and method, even a young child can quickly learn to understand and recognize notes and identify corresponding piano keys.

In one aspect of the invention, an exemplary method entails displaying a musical keyboard having a plurality of keys, a musical staff and a note on the staff. One of the plurality of keys corresponds to the note. The corresponding key produces a sound corresponding to the note when played. The name of the note is pronounced by a narrator or some other character. The note is visually identified on the staff by the narrator or some other character. The note may also be sung. The note is then associated with the corresponding key. A sound corresponding to the corresponding key is played.

In another aspect of the invention, association of the note with a corresponding key may entail generating a note character and associating the note character with the note and key. The note character may be projected or formed from the note and extended, linked or moved to the key.

In another aspect of the invention, the note, key and note character may be color coded to reinforce the association. The color-coded objects may feature the same color(s).

In yet another aspect of the invention, a system for teaching musical notes is provided. An exemplary system comprises a display device equipped to produce scene images and audio output corresponding to scene signals. The scene images generated by the display from the signals includes a visual display of a musical keyboard having a plurality of keys, a musical staff and a note on the staff. One of the plurality of keys corresponds to the note and produces a sound corresponding to the note when played. Means for visually identifying the note on the staff, such as a narrator character, is displayed. Additionally, means for visually associating the note with the corresponding key, such as a note character is also displayed. The audio output includes pronouncement of the name of the note; audible identification of the note on the staff; audibly singing the note, and audibly playing a sound corresponding to the corresponding key.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the Figures are not intended to illustrate every implementation of the invention. Specifically, the invention is not limited to the depicted exemplary embodiments and implementations, or to the selection or order of steps depicted in the Figures.

DETAILED DESCRIPTION

In an exemplary implementation of the invention, an animated system and method adapted to teach identification of music staff notes, the names and sounds of notes, as well as piano keys corresponding to notes is provided.

An exemplary system includes a sequence of scenes adapted to teach music notation. The scenes are configured for display in sequence as a motion picture (e.g., an animated cartoon) on a television, computer monitor or any other display device suitable for viewing by users. In a preferred implementation, the scenes are color and include audio output. However, scenes that exhibit gray shading and monochrome scenes that consist of black (or other suitable color) lines defining the shape of the objects on a white (or other suitable light color) background, also come within the scope of the invention. The scenes may be created using any methods suitable producing a series of scenes configured for display in sequence as a motion picture, whether such methods are now known or hereafter developed.

The display device (i.e., an audiovisual display device) generates scene images and audio output from signals corresponding to the scenes. The signals may be produced in a conventional manner from recorded programs. Illustratively, the display device may be comprised of a television, a television with a peripheral device (e.g., a DVD player) adapted to read data from a compatible medium (e.g., a DVD), a computer having a display and one or more speakers, a projector and one or more speakers, a game with a display unit and one or more audible output units, or any other device or combination of devices adapted for displaying images and producing sounds from communicated signals and/or data stored on a medium.

Various modes of communication may be utilized to provide requisite signals and/or data to a display device. For example, signals for the scenes may be broadcasted to a display device as program signals via wireless, cable, or satellite communication, or a combination of any of the foregoing. Alternatively, a storage medium (e.g., magnetic or optical recording media, such as a nonvolatile memory, magnetic disk, video tape, film, CD or DVD) may be utilized to record data corresponding to the scenes for processing and playback on a compatible device. The display device is equipped for such communication or processing and playback.

Figure 1:
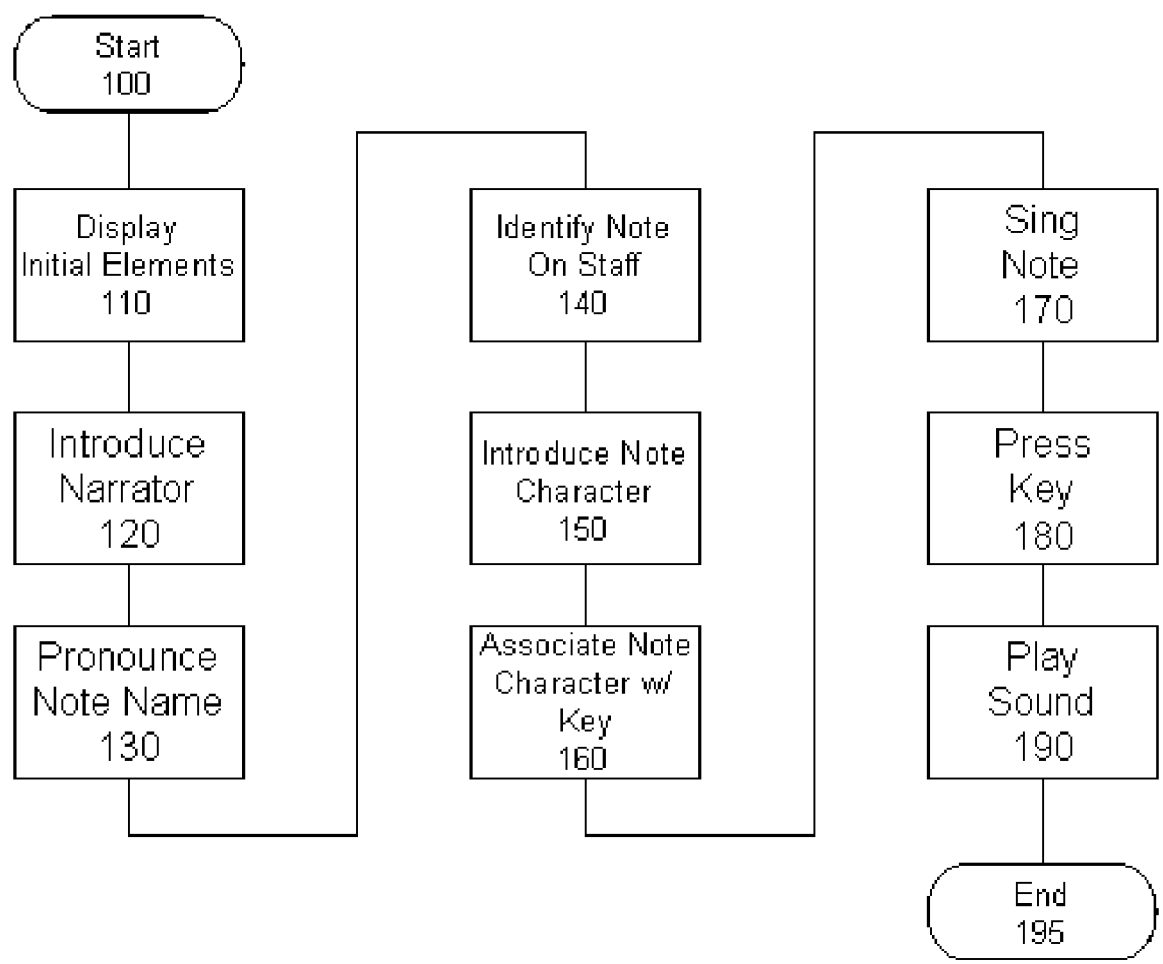
FIG. 1 provides a high level flowchart of an exemplary method of teaching musical notes according to principles of the invention.

Referring now to FIG. 1, a high-level flowchart of an exemplary method of teaching musical notes according to principles of the invention is provided. The method may be implemented alone or with other materials. Thus, for example, the method may be implemented as a component of a larger program.

Upon starting the method 100, initial visual elements are displayed as in step 110. The exemplary methodology entails colorfully displaying a narrator 230, a musical staff 210 with a note 220, and a keyboard 230, as conceptually shown in FIG. 2. The narrator 200 explains the elements to a viewer. In a preferred implementation, a fanciful colorful sprite, such as object 200 in FIG. 2, acts as the narrator. This approach captures a viewer's imagination and helps maintain attention throughout performance of the method.

Figure 2:
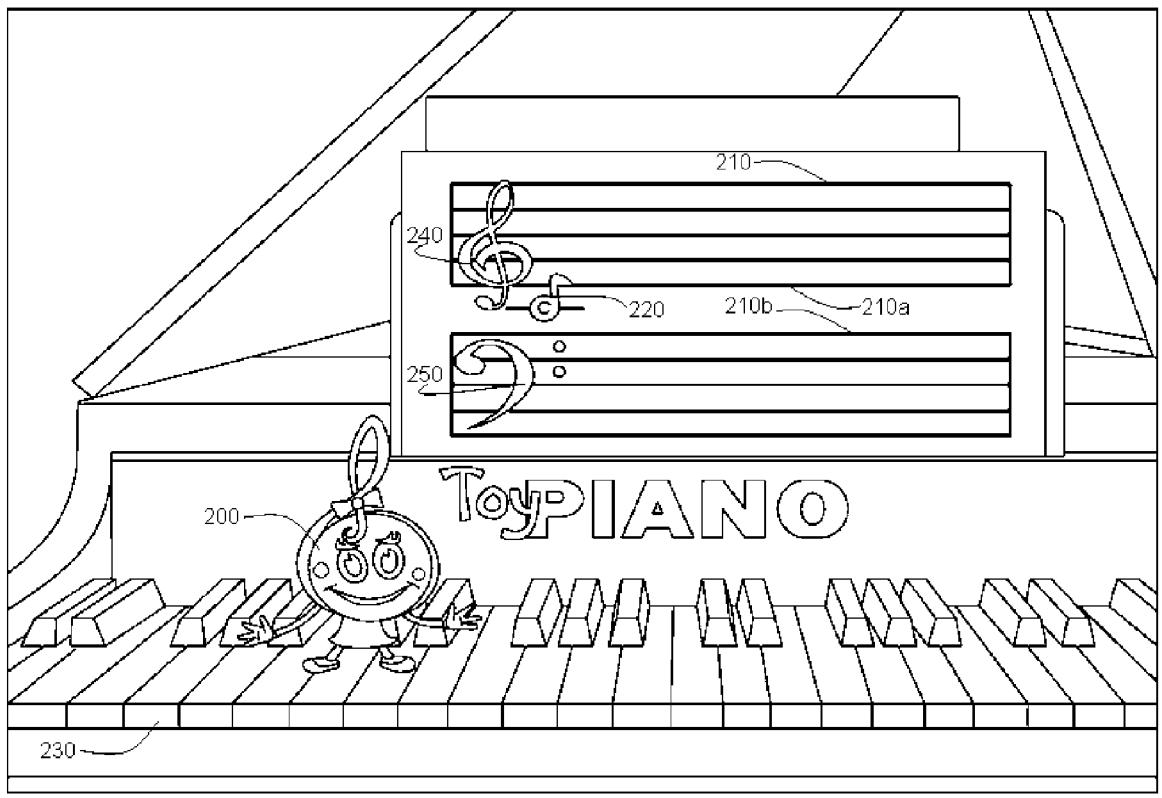
FIG. 2 provides a high level view of an exemplary screen display for a system according to principles of the invention.
Figure 3:
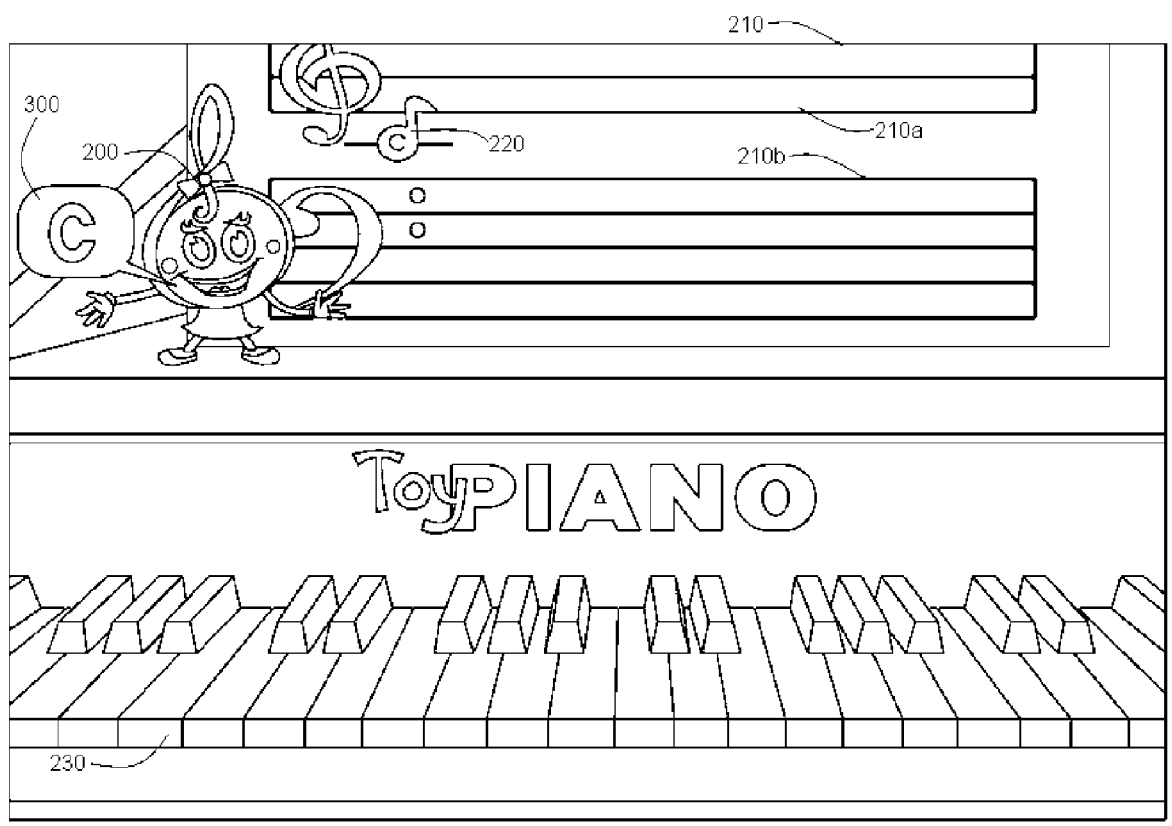
FIG. 3 provides a high level view of an exemplary screen display for a system according to principles of the invention.

The exemplary musical notation element(s) include a grand staff 210, comprised of two staffs 210a, 210b. Each staff includes a set of five horizontal lines on which note symbols may be placed. As shown in FIG. 2, the upper staff 210a has a treble clef 240 and the lower staff 210b has a bass clef 250. In this case, a middle C 220 is between the two staffs on a ledger line below the upper staff 210a and above the lower staff 210b.

A musical keyboard, e.g., a piano keyboard 230, comprised of a plurality of adjacent depressible keys is also displayed, in its entirety and/or in part. The keyboard 230 may represent any musical instrument that has keys corresponding to notes, including a piano, harpsichord, clavichord, organ, synthesizer, celesta, accordion, melodica, glasschord, and carillon.

Once the initial elements are displayed, the narrator may introduce herself by name and/or role, as in step 120 of the flowchart in FIG. 1. For example, the narrator 200 may greet the viewers with her fanciful name (e.g., Trebellina™, a trademark of The Cristofori Baby Company LLC). The narrator 200 may also explain that she will show the viewers certain notes and keys.

Next, the narrator 230 pronounces (i.e., causes the display device emit an audible statement of) the name of a displayed note 220 and identifies the note 200 on the displayed musical grand staff 210, as in steps 130 and 140 of the flowchart in FIG. 1. By way of illustration and not limitation, the narrator 200 may pronounce and identify "middle c" 220 (a/k/a C4).

Figure 4:
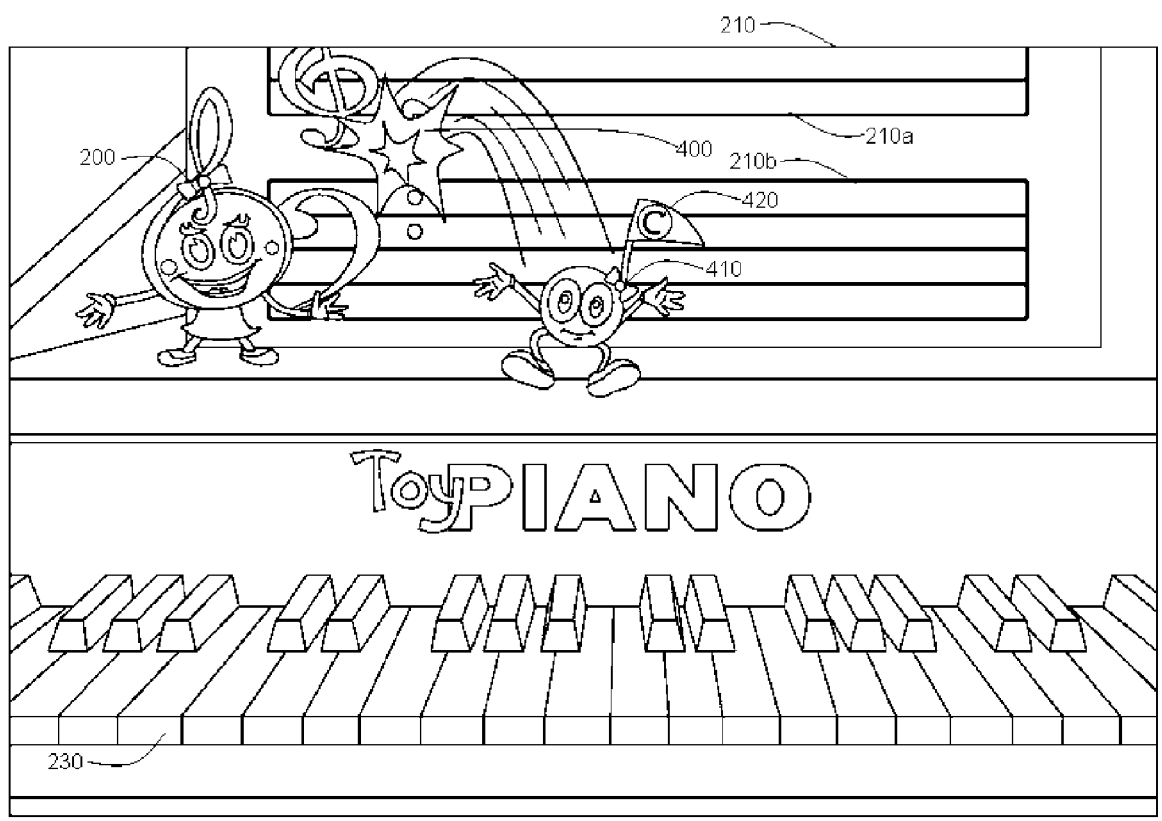
FIG. 4 provides a high level view of an exemplary screen display for a system according to principles of the invention.

Next, a note character 410 is introduced, preferably in a dramatic transformative fashion, as in step 150 of the flowchart in FIG. 1. In a preferred implementation, a fanciful colorful sprite, such as object 410 in FIG. 4, acts as the note character 410. However, other graphical representations, such as figures, objects or icons may be utilized as a note character, without departing from the scope of the invention. As used herein, the term character encompasses all such representations. This dramatic introduction of a fanciful character captures a viewer's imagination and helps maintain a viewer's interest and attention. The narrator 200, note character 410, or both may state a name for the note character 410. The note character 410 corresponds to the displayed note 220 previously introduced by the narrator 200. Illustratively, the note 220 may project the note character 410 from the note 220 through a dramatic burst 400, as conceptually shown in FIG. 4, via animation (such as graphical imagery or special effects). The note character 410 may include a symbol 420 to clearly, logically associate the note character 410 with the corresponding note 220. Additionally, to reinforce the association, the note character 410 and note 220 may feature the same color(s).

Figure 5:
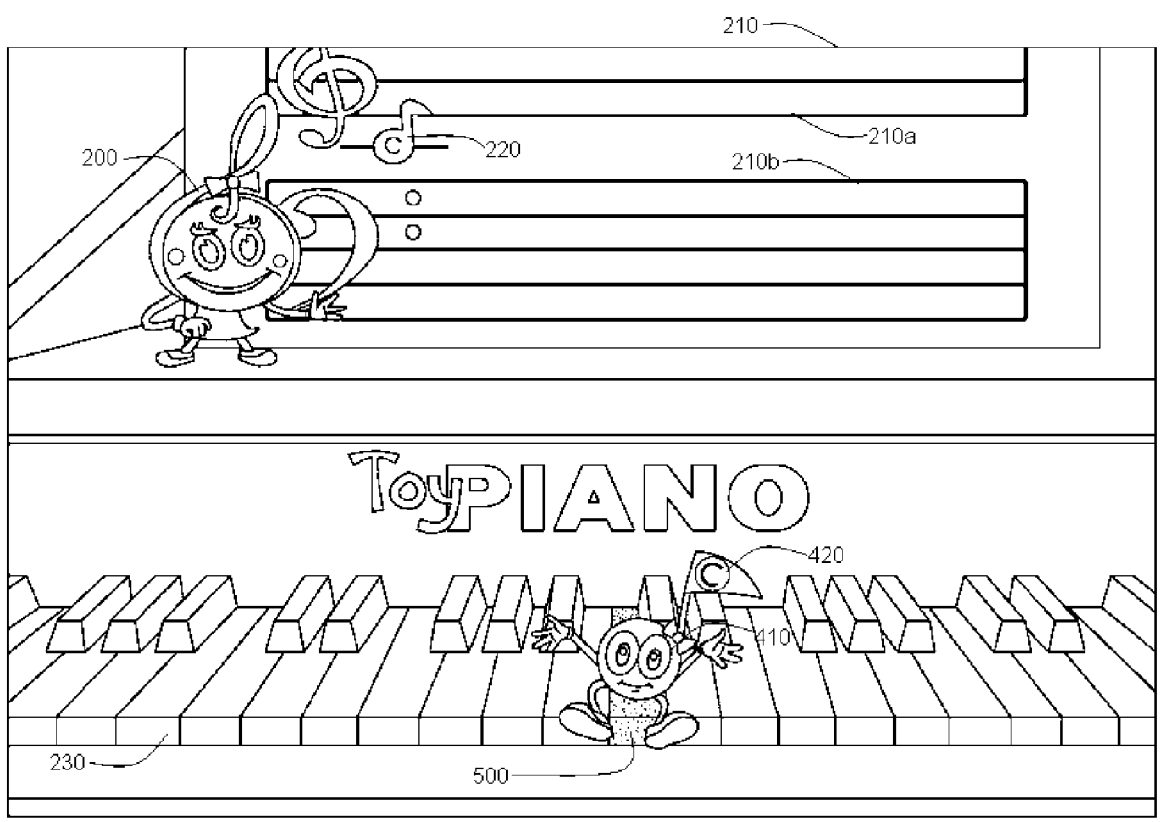
FIG. 5 provides a high level view of an exemplary screen display for a system according to principles of the invention.

Subsequently, the note character 410 is associated with key on a keyboard 230, as in step 160 of the flowchart in FIG. 1. The technique employed for association should clearly indicate to a viewer that the key 500 corresponds to the note 220, as in FIG. 5. By way of illustration and not limitation, the association technique may entail moving, extending or linking the note character 410 to the key 500 via animation. However, other association techniques that clearly relate the note character 410 to the key 500 may be used without departing from the scope of the invention. This step introduces the viewer to the key 500 corresponding to a note 220.

At any step of the method after the character note 410 and/or the note 220 have been introduced, a character may sing the note 220, as in step 170 of the flowchart in FIG. 1. Singing entails producing musical sounds with a voice. The sounds correspond to the note. The narrator 200, note character 410, and/or one or more other characters may sing the note 220 alone, simultaneously as a group, or in some sequence. This step introduces the viewer to the sound of the note 220 as sung.

Figure 6:
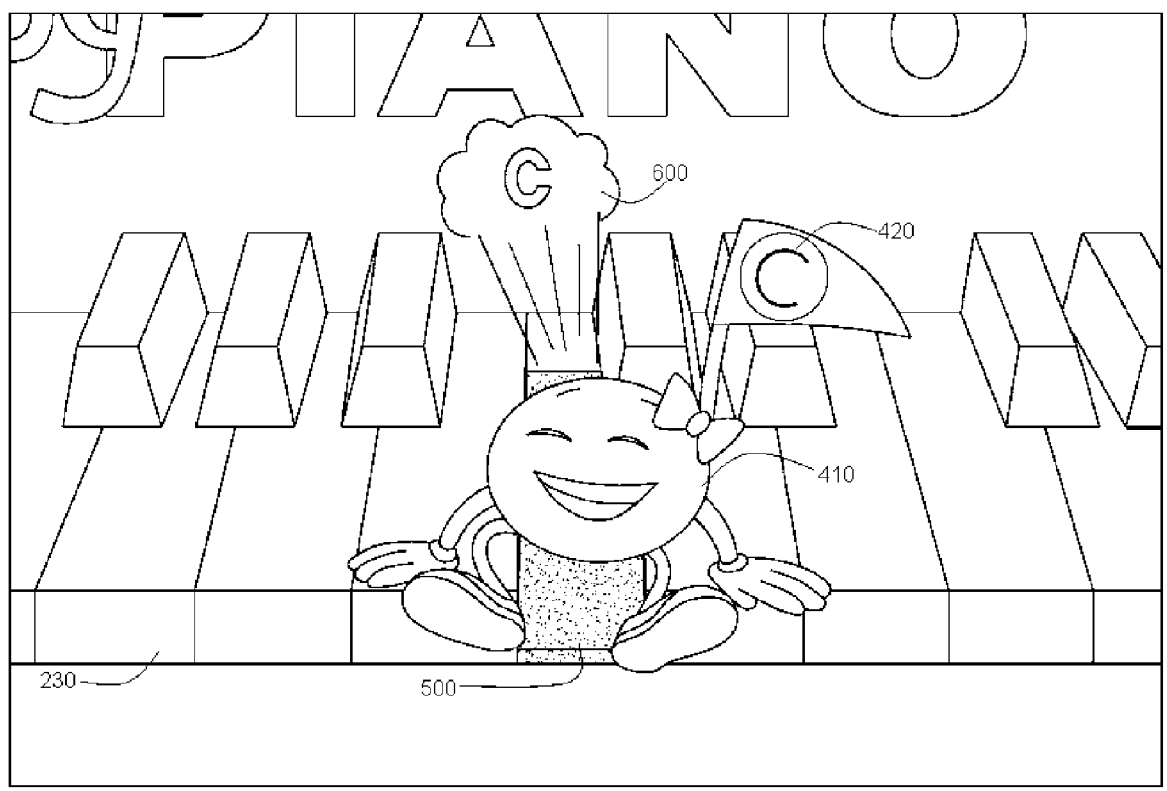
FIG. 6 provides a high-level view of an exemplary screen display for a system according to principles of the invention.

Next, the corresponding key 500 of the displayed keyboard 230 is shown being pressed, via animation, as in step 180 of the flowchart in FIG. 1. This step reinforces the association of the key 500 with the note 220, while introducing viewers (particularly young viewers) to the mechanics of actuating keys, as shown in FIG. 6.

As the key 500 is pressed, the system produces an audible sound 600 corresponding to the instrument's depressed key 500, as in step 190 of the flowchart in FIG. 1. This step informs the viewer of an instrument's sound 600 corresponding to the played key 500, as conceptually illustrated in FIG. 6. Thus, this step further reinforces the association of the key 500 with the note 220, while introducing viewers to an actual sound of the actuated key 500.

Upon completion of the foregoing steps 195, the same (or a closely similar) process may be repeated for other notes and keys. The same narrator or a different narrator may be used. The techniques used for associating a note character with a note may be the same as or different from the techniques described above. Steps may be added to the process to lengthen the lesson and/or expand the entertainment. The steps may also be reordered into another logical sequence. These and other variations may be applied without departing from the scope of the invention, so long as a musical staff with a note, and a piano keyboard are displayed; the name of the note displayed on the musical staff is pronounced; a note character is introduced and associated with the note and a corresponding key of the keyboard; the key is depressed and the sound of the note is played, in any logical order. Optionally, the sound of the note may also be sung.

In another embodiment, the system and method may be interactive, i.e., accept and process user inputs. Thus, for example, a game that implements a method according to principles of the invention may require a user to identify a key corresponding to a note, or identify a note corresponding to a key, or identify a sound corresponding to a note or key, or identify the name of a note or key. Such an implementation and other interactive embodiments also come within the scope of the invention.

In alternative implementations, costumed actors, clay animation and/or puppets may be utilized to create a sequence of scenes in accordance with principles of the invention. Furthermore, special effects may be added. Thus, the invention is not limited to cartoons or computer generated images.

While the invention has been described in terms of various embodiments and implementations, those skilled in the art will recognize that the invention can be practiced with modification within the spirit and scope of the appended claims.

What is claimed is:

1. A method of teaching musical notes using an audiovisual display device, said method comprising steps of:
    for each of a plurality of notes to be taught, displaying a musical keyboard having a plurality of keys, a musical staff and a note from said plurality of notes to be taught on the staff, wherein one of the plurality of keys corresponds to the note, said corresponding key producing a sound corresponding to the note when played;
    pronouncing the name of the note;
    identifying the note on the staff;
    singing the note;
    associating the note with the corresponding key; and
    playing a sound corresponding to the corresponding key.

2. A method of teaching musical notes according to claim 1, said method further comprising a step of introducing a narrator, said narrator pronouncing the name of the note.

3. A method of teaching musical notes according to claim 1, said method further comprising a step of introducing a narrator, said narrator identifying the note on the staff.

4. A method of teaching musical notes according to claim 1, said method further comprising a step of introducing a note character and associating the note character with the note on the staff.

5. A method of teaching musical notes according to claim 4, wherein the step of singing the note comprises singing the note by the note character.

6. A method of teaching musical notes according to claim 1, said method further comprising a step of playing the key.

7. A method of teaching musical notes according to claim 1, said method further comprising steps of introducing a narrator, said narrator pronouncing the name of the note and identifying the note on the staff.

8. A method of teaching musical notes according to claim 7, said method further comprising a step of introducing a note character and associating the note character with the note on the staff.

9. A method of teaching musical notes according to claim 8, said method further comprising a step of singing the note.

10. A method of teaching musical notes according to claim 9, said method further comprising a step of playing the key.

11. A method of teaching musical notes according to claim 10, wherein the step of associating the note with the corresponding key includes linking the note character associated with the note on the staff to the corresponding key.

12. A method of teaching musical notes according to claim 10, wherein the step of associating the note with the corresponding key includes moving the note character associated with the note on the staff to the corresponding key.

13. A method of teaching musical notes according to claim 10, wherein the step of associating the note with the corresponding key includes extending the note character associated with the note on the staff to the corresponding key.

14. A method of teaching musical notes according to claim 10, wherein the step of introducing a note character and associating the note character with the note on the staff includes transforming the note into a note character.

15. A method of teaching musical notes according to claim 10, wherein the step of introducing a note character and associating the note character with the note on the staff includes projecting the note character from the note via animation.

16. A method of teaching musical notes according to claim 10, wherein the note character and note on the staff feature the same color.

17. A method of teaching musical notes according to claim 10, wherein the note character, note on the staff and corresponding key feature the same color.

18. A system for teaching musical notes, said system comprising a display device equipped to produce scene images, including a scene image for each of a plurality of notes, and audio output corresponding to scene signals, wherein
    each of said scene images include a display of a musical keyboard having a plurality of keys, a musical staff and a note on the staff, said note being a note from the plurality of notes, wherein one of the plurality of keys corresponds to the note, said corresponding key producing a sound corresponding to the note when played;
    means for visually identifying the note on the staff
    means for visually associating the note with the corresponding key; and
    said audio output includes pronouncement of the name of the note; audible identification of the note on the staff; audibly playing a sound corresponding to the corresponding key; and audibly singing the note.

19. A system for teaching musical notes according to claim 18, wherein said scene images further include a narrator, said narrator visually identifying the note on the staff, and a note character, said note character being visually associated with the note on the staff.

20. A system for teaching musical notes according to claim 19, wherein said audio output including audibly singing the note further includes audibly singing the note by the note character.

* * * * *